United States Patent [19]
Cortez

[11] Patent Number: 5,244,220
[45] Date of Patent: Sep. 14, 1993

[54] PORTABLE RECYCLING AND WORK CENTER

[76] Inventor: Richard C. Cortez, 700 S. Blackbird Roost, #58, Flagstaff, Ariz. 86001

[21] Appl. No.: 779,307

[22] Filed: Oct. 18, 1991

[51] Int. Cl.$^5$ ............................................... B62B 1/00
[52] U.S. Cl. .................................. 280/47.26; 248/127
[58] Field of Search ............... 280/41.18, 47.19, 47.24, 280/47.26, 47.34, 47.35, 79.11, 79.2, 79.3; 248/127, 128, 129, 133; 211/134

[56] References Cited

U.S. PATENT DOCUMENTS

| | | | |
|---|---|---|---|
| 2,784,999 | 3/1957 | Hunt | 280/47.35 |
| 3,460,850 | 8/1969 | Franklin | 280/47.26 |
| 3,472,392 | 10/1969 | Hahn | 280/47.35 |
| 4,632,412 | 12/1986 | Nasgowitz | 280/47.26 |
| 4,923,202 | 5/1990 | Breveglieri et al. | 280/47.35 |
| 5,069,466 | 12/1991 | Propst | 280/79.3 |

*Primary Examiner*—Richard M. Camby

[57] ABSTRACT

An ergonomic organizing, recycling, and work center, on wheels having a can crusher and multiple containers comprising plastic bags held under a shelf with an opening in the shelf over each bag. Tools and facilities for kitchen food preparation and household work are mounted thereon. The center has a housing opening to the front side and the housing is convertible for use as a wheeled hand truck. A modular structure comprises a plurality of shelves mounted between parallel sides, and having a back and a floor. A clock is mounted near the top of the structure. On the right exterior are mounted an aluminum can crusher, a first aid kit, a dust pan and a broom. On the left exterior are mounted a paper towel dispenser, a can opener, a bottle opener, a fire extinguisher, and a mop. Adequate interior cubage is provided for performance of work functions that require shelf area, and for storage of recyclable materials comprising glass, aluminum, and newspapers. Within the structure on a lower shelf are apertures providing access to containers for trash and for recyclable materials. Interior shelves are removable, providing conversion to a hand truck.

8 Claims, 4 Drawing Sheets

PORTABLE RECYCLING AND WORK CENTER

FIELD OF THE INVENTION

This invention is in the field of efficiency carts for holding facilities for kitchen and housecleaning work.

BACKGROUND

Recycling has been a goal of environmentalists for decades. The popularity of recycling has had some up-swing but programs have had disadvantages for lack of handy home facilities.

A can crusher, for example, is often in an unhandy position. Twin containers with plastic linings, one for reclyables and one for other waste have had no convenient and popular product design.

Many homes and apartments simply do not have space set aside for handy storage, and gripping of much used kitchen and janitorial tools.

An objective hereof is to provide a work center on wheels, a cart having horizontal work space and having positions for the mounting of these many tools and facilities. Its housing can be made of wood, metal, or of thermoplastic in many attractive shapes.

An important feature is to recognize the problem of storage of a wheeled carrier for bringing groceries in from a car and movement of luggage. Space is at a premium in homes and apartments. The work center to a wheeled cart with open top when needed.

Efficiency, as time studies could show, is gained by being able to move many tools quickly to a work location, where they are quickly reached, saving space also.

The work center hereof has a practical place in a home kitchen, in these times of recycling and ecology, potentially as the next main utility after the sink, stove, and refrigerator.

It has been common for can crushers to be attached to cabinets, or under sinks, but to have one out and available is an objective hereof. The availability is enhanced by mounting the can crusher on a wheel cart so that the crusher can be moved quickly to where the cans are, perhaps to a different room. There would be no need to bring a pile or piles of cans to the crusher.

A dinner table can be kept looking as attractive as possible by disposing emptied dishes onto the cart since the work center can be wheeled close to a family dinner table.

The crusher-cart can be positioned where a waste container usually sits and, by also having space on the work center for one or more waste containers, no extra space is needed. One compact unit takes care, then, of waste disposal and can crushing both.

An extra feature is to have the frame of the center form a box opening so that when tipped into wheel-cart position, the frame-box is open at its top and can receive a load, unhampered by the removed items such as a can crusher, waste receptacles, and one or more removable shelves. Such a wheel-cart use is valuable in moving heavy items, such as luggage, or a load of groceries.

The wheel-cart can hold many tools and readily-reachable items mounted on it for handiness and speed in this busy, busy, life.

A modular work structure comprises a plurality of shelves positioned between and attached to parallel sides. A back and a floor are provided for the structure. A clock is mounted near the top of the structure. On the right exterior are mounted an aluminum can crusher, a first aid kit, a dust pan and a broom. On the left exterior are mounted a paper towel dispenser, a can opener, a bottle opener, a fire extinguisher, and a mop. Adequate interior cubage is provided for storage of recyclable materials comprising glass, aluminum, and newspapers. Within the structure on a lower shelf are apertures providing access to containers for trash and for recyclable materials. Interior shelves are removable, providing conversion to a hand truck.

It is an objective of the present invention to provide a recycling and work center of high efficiency in time study, in cubage, in convenience, and in safety. It is a further objective of the invention to provide convenient storage for recyclable materials. It is a still further objective of the invention to provide means for preparing materials for recycling. It is a yet further objective of the invention to provide convenient and efficient locations of equipments for general use in housekeeping duties. It is still a further objective of the invention to provide a convenient view of a timepiece during work operations. It is a yet further object of the invention to provide convenient access to a first aid kit and a fire extinguisher during work operations. Its a still further objective of the invention to provide portability of a recycling and work center. It is a yet further objective of the invention to provide a conveniently accessible hand truck during work operations.

A BRIEF DESCRIPTION OF THE DRAWINGS

A DETAILED DESCRIPTION OF THE PREFERRED EMBODIMENT

Figure 1:
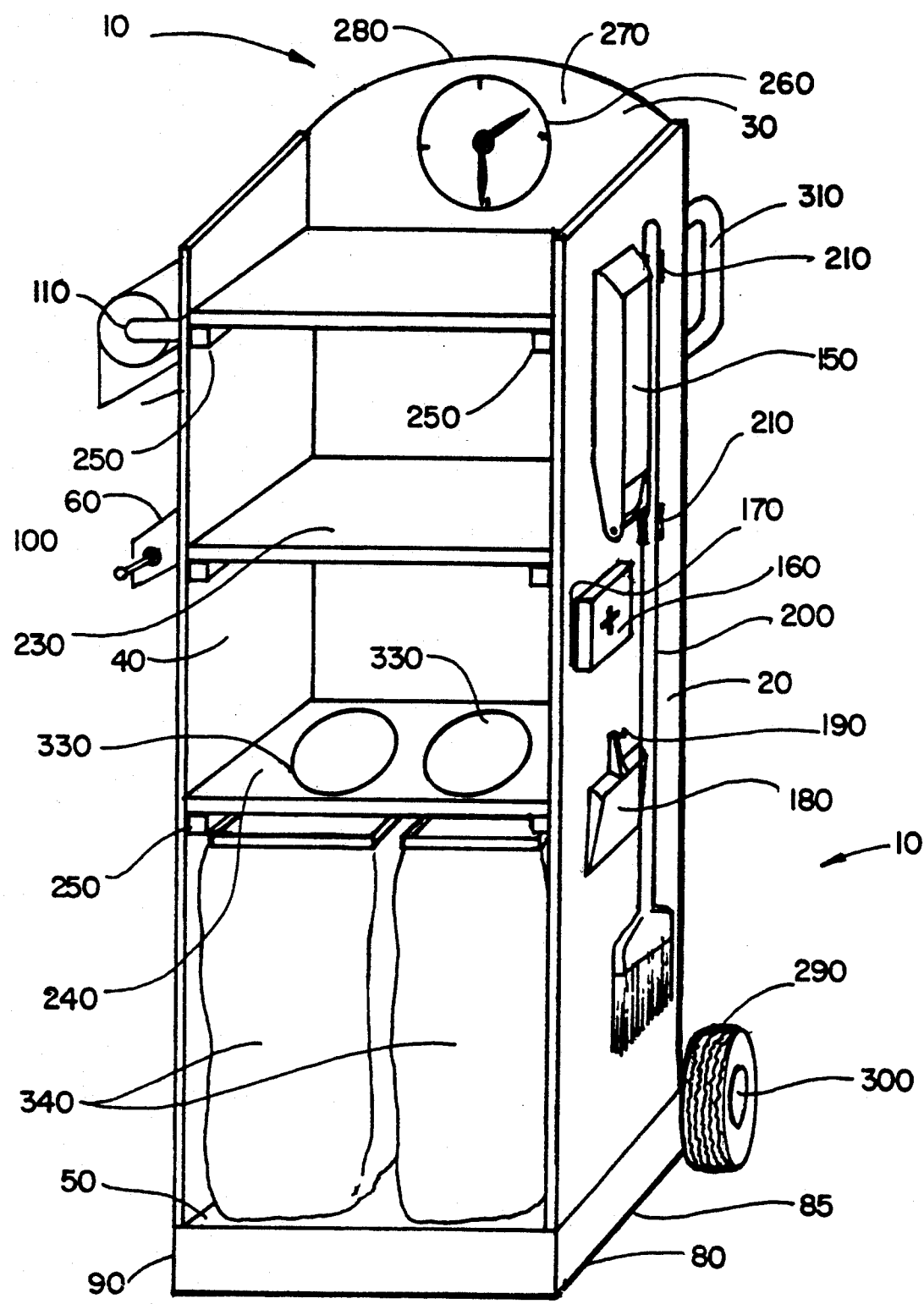
FIG. 1 is a three-quarters front elevational view of the invention, namely, an energy efficient, modular ergonomic work center comprising a portable organizing, recycling and work center.

In the drawings, in FIGS. 1, 2, 3, and 4 will be seen an energy efficient, modular ergonomic work center 10 comprising a portable organizing, recycling and work center 10, or portable recycling and work center 10, or recycling and work center 10, of modular constitutency. All members thereof are of solid phase and of rigid configuration, attached to one another in an assembled manner comprising an integrated modular single unit structure.

Figure 2:
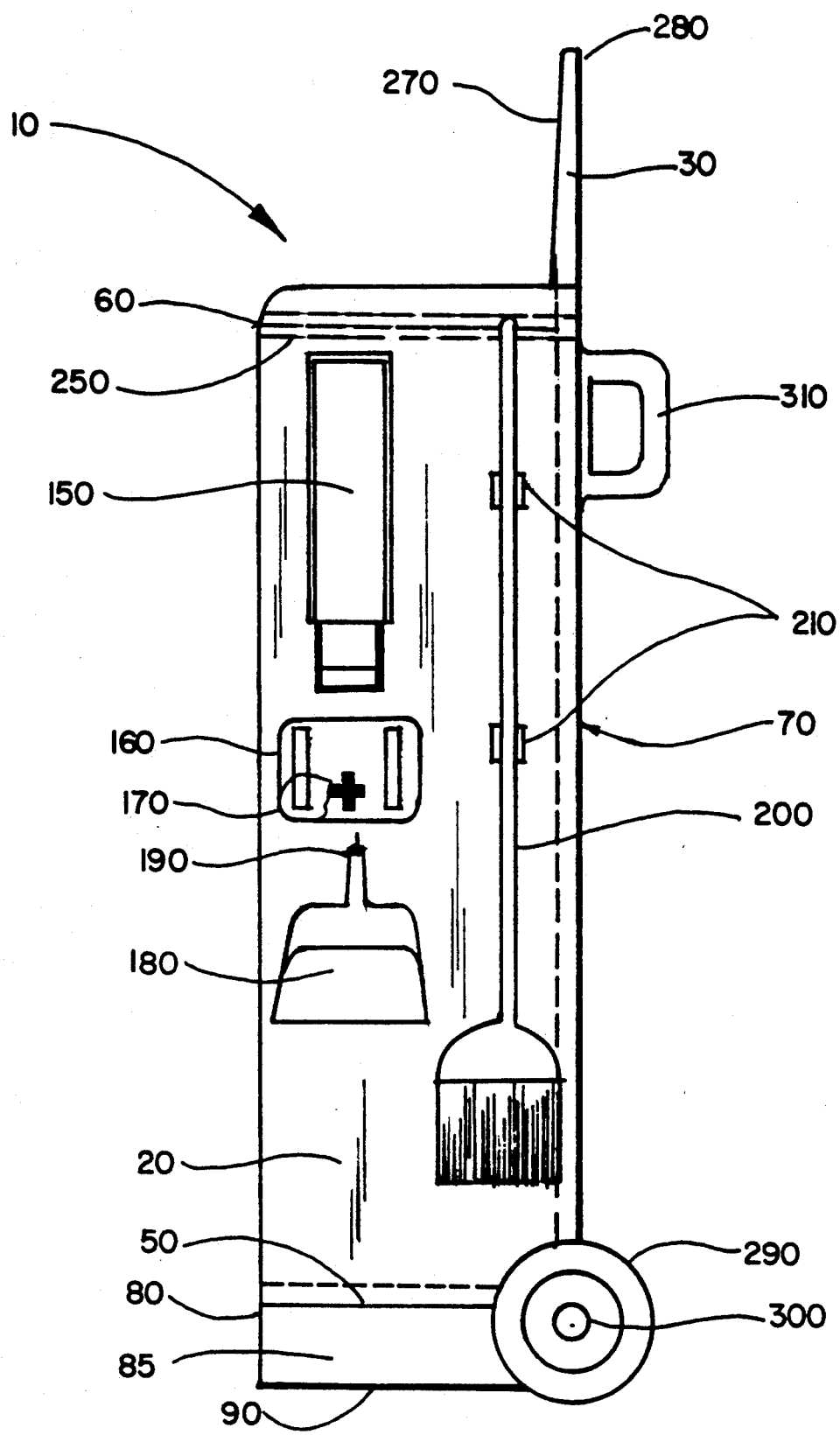
FIG. 2 is a right elevational view of the invention.

In FIG. 2, a right member 20 thereof comprises a first broadened opposed surface structure vertically disposed.

A rear member 30 of the recycling and work center 10 comprises a broadened rear surface structure vertically disposed.

Figure 3:
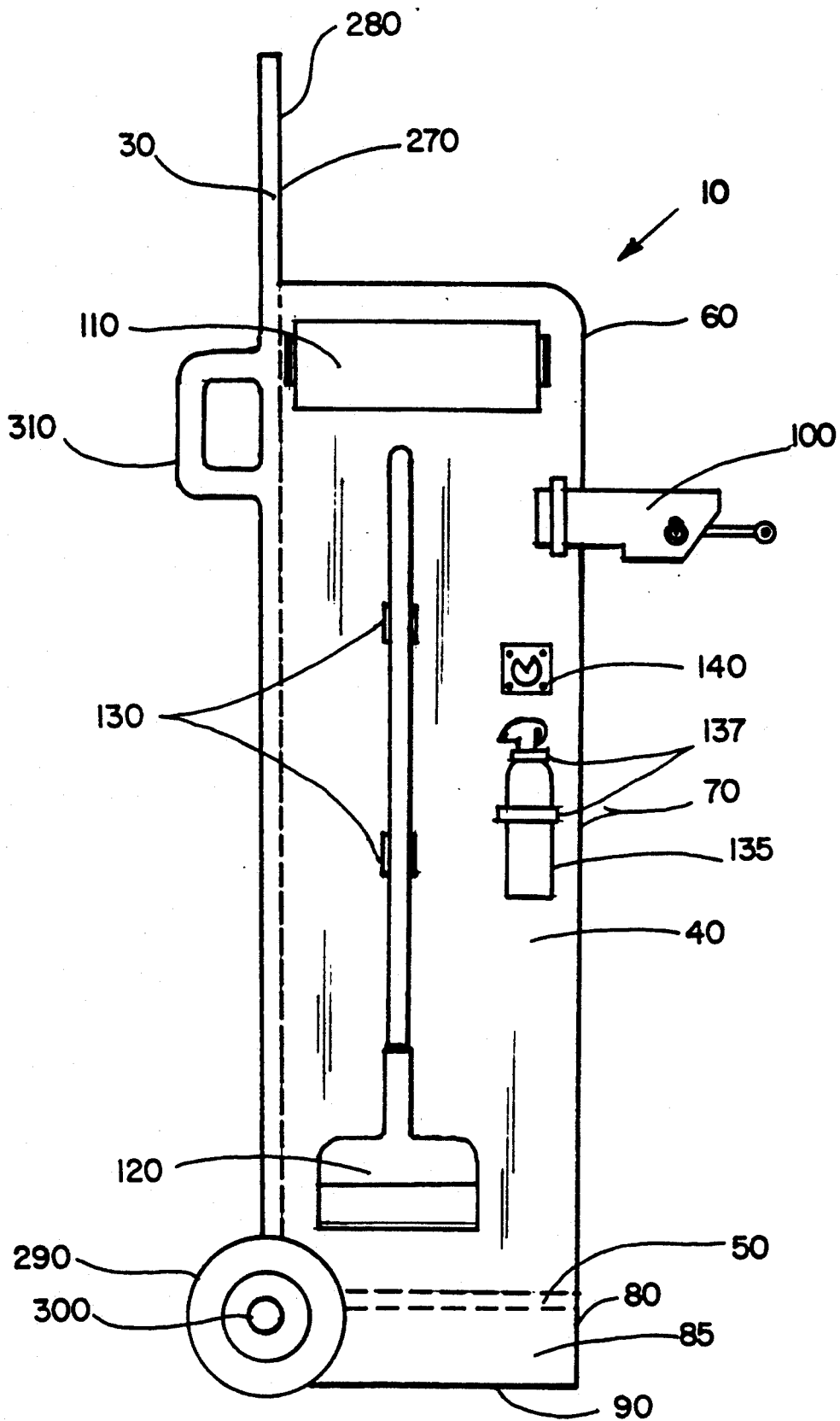
FIG. 3 is a left elevational view of the invention.

In FIG. 3, a left member 40 of the recycling and work center 10 comprises a second broadened opposed surface structure vertically disposed.

The right member 20 is rigidly attached to the rear member 30.

The rear member 30 is rigidly attached to the left member 40.

A floor member 50 of the recycling and work center 10 comprises a broadened lower surface structure horizontally disposed.

The floor member 50 is rigidly attached to the left member 40, the rear member 30, and the right member 20.

A top member 60 of the recycling and work center 10 comprises a broadened top surface structure horizontally disposed.

The top member 60 is rigidly attached to the left member 40, the rear member 30 and the right member 20.

The foregoing five members comprise an upper portion 70 of the recycling and work center 10.

A skirt 80 comprises a plurality of elongated, flattened members 85 disposed in the vertical plane, attached to one another at angles of ninety degrees, forming a box structure of low height comprising a structural base 90.

The structural base 90 is disposed below the upper portion 70 of the recycling and work center 10.

The upper portion 70 of the recycling and work center 10 during a non-portable mode thereof is structurally supported by the base 90.

In FIG. 3, a can opener 100 is provided. The can opener 100 is attached to the left side 40 of the recycling and work center 10.

A paper towel dispenser 110 is provided.

The paper towel dispenser 110 is attached to the left member 40 of the recycling and work center 10.

A mop 120 is provided.

A first attaching means 130 secures the mop 120 to the left member 40. The first attaching means 130 comprises a plurality of spring clamps typical in the art.

A fire extinguisher 135 is provided.

The fire extinguisher 135 is attached to the left member 140.

A second attaching means 137, standard in the art and furnished as part of a fire extinguisher assembly, secures the fire extinguisher 135 to the left member 40.

A bottle opener 140 is provided.

The bottle opener 140 is attached to the left member 40.

In FIG. 2, a can crusher 150 is provided.

The can crusher 150 is attached to the right member 20.

A first aid kit 160 is provided.

The first aid kit 160 is secured to the right member 20 by a third attaching means 170. The third attaching means 170 comprises strips of Velcro material known in the art.

A dust pan 180 is provided.

A fourth attaching means 190 secures the dust pan 180 to the right member 20.

The fourth attaching means 190 comprises a hook typical in the art.

A broom 200 is provided.

A fifth attaching means 210 secures the broom 200 to the right member 20. The fifth attaching means 210 comprises a plurality of spring clamps typical in the art.

It will be apparent in FIGS. 2 and 3 that in those instances where the first attaching means 130 and the fourth attaching means 210 are of dimensions substantially identical, and where on-center displacement of respective spring clamps is compatible, locational positions of the mop 120 and of the broom 200 are interchangable. A preferred logic, apparent to those skilled in the art, comprises the broom 200 positioned adjacent to the dust pan 180, as shown in the drawings.

Figure 4:
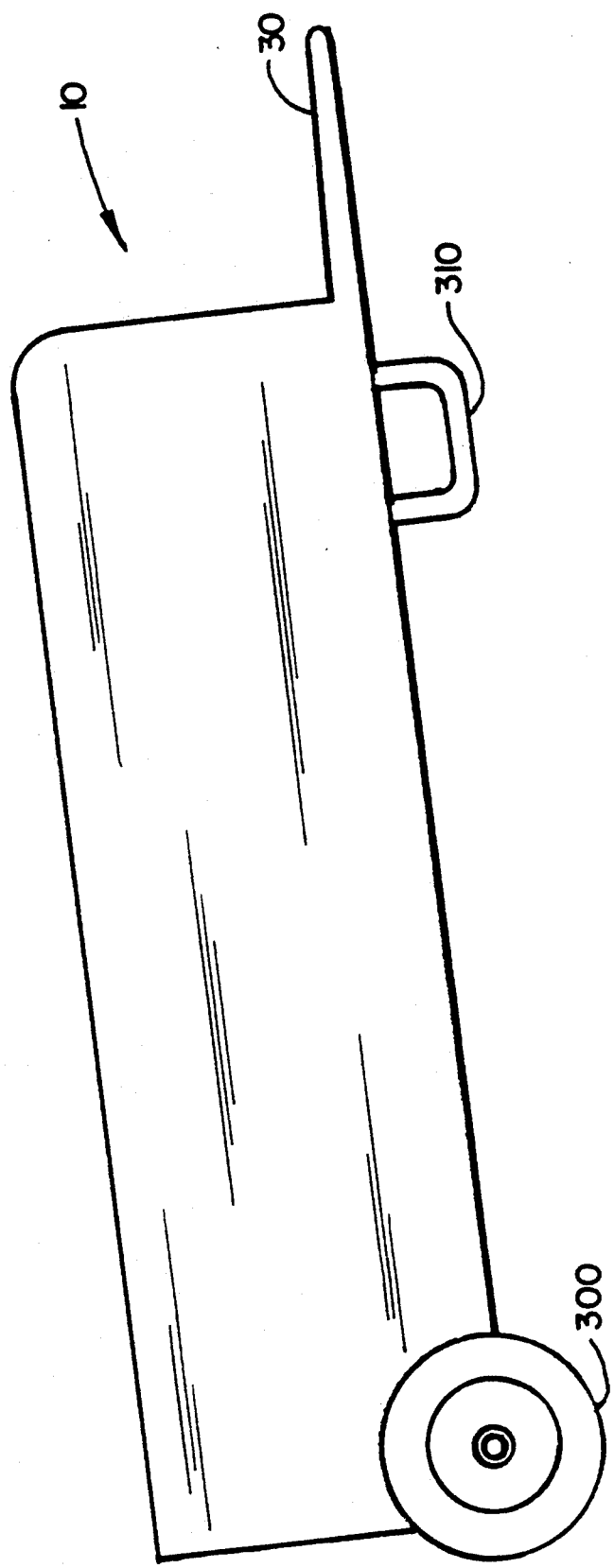
FIG. 4 is a three-quarters front elevational view of the invention, showing shelves removed, with the invention operational as a hand truck.

In FIGS. 1 and 4, a plurality of shelves is provided comprising a middle shelf 230, and a bottom shelf 240, horizontally disposed between the left member 40 and the right member 20.

A plurality of supportive means 250 is provided attaching the shelves 230, and 240 and the top member 60 to the left member 40 and the right member 20.

The shelves 230 and 240 are removable from the recycling and work center 10.

The shelves 230 and 240 comprise broadened structures of solid phase and of rigid configuration.

A clock 260 is provided. The clock 260 is attached to a front surface 270 of the rear member 30 and disposed near a top portion 280 thereof.

A clock mounting aperture 285 through the rear member 30 provides means of securing the clock 260.

The clock 260 is removable from the rear member 30.

A pair of wheels 290 is provided. The pair of wheels 290 is provided with an axle 300.

The axle 300 and the pair of wheels 290 are rotationally attached to the floor member 50.

Means providing manned propulsion of the recycling and work center 10 comprise a plurality of handles 310 disposed rearwardly thereof.

In FIG. 4, the recycling and work center 10 has the plurality of shelves 230 and 240 removable therefrom.

The recycling and work center 10 is thereby operational as a hand truck 320.

Applicant has found that a wheel with hard rubber tire is very operational in the instance of the wheels 290. Other wheels and tires utilized by those skilled in the art are within the scope and intent of this present invention.

In FIG. 1, a plurality of aperatures 330 is provided through the bottom shelf 240 of the recycling and work center 10.

The apertures 330 provide access to a plurality of containers 340 disposed between the bottom shelf 240 and the floor member 50.

It will be seen that the recycling and work center 10 has tools attached in a manner for convenient access, removal, and use.

A fire extinguisher and a first aid kit enhance safety when utilized logically by those skilled in the art.

Shelves are provided as a place for doing work, and as a place for storage. Further storage is provided in containers near the bottom of the structure.

The recycling and work center 10 is movable, enhancing convenient placement and access for use in work.

Upon removal of a plurality of the shelves thereof, the recycling and work center 10 becomes a hand truck.

A clock makes available the observation of a timepiece during work processes. The clock removable makes feasible temporary protection of the timepiece during movement of the recycling and work center 10 and during use thereof as a hand truck.

The recycling and work center 10 provides centralization of equipments and materials for efficient use in housekeeping duties, janitorial work, and recycling.

It will be apparent that the objects of the invention have been met.

The handles are of one piece with the sides of the housing, both can be of wood, plastic or metal. In the FIG. 4 position the lower wall and 4 sides can be of one-piece thermoplastic.

I claim:

1. An energy efficient, modular ergonomic work center comprising a portable organizing, recycling and work center, all members thereof of solid phase and of rigid configuration, attached to one another in an assembled manner comprising an integrated modular single unit structure;

said portable organizing, recycling and work center having a right member comprising a first broadened opposed surface structure vertically disposed;

a rear member comprising a broadened rear surface structure vertically disposed;

a left member comprising a second broadened opposed surface structure vertically disposed;

said right member, rigidly attached to said rear member said rear member, rigidly attached to said left member;

a floor member comprising a broadened lower structure horizontally disposed;

said floor member rigidly attached to said left, said rear, and said right members;

a top member comprising a broadened top surface structure horizontally disposed;

said top member rigidly attached to said left, said rear, and said right members;

said right, rear, left, floor, and top members comprising an upper portion of said recycling and work center;

a skirt comprising a plurality of elongated, flattened members disposed in the vertical plane, attached to one another at angles of ninety degrees, forming a box structure of low height comprising a structural base;

said structural base disposed below and attached to said upper portion of said recycling and work center;

said upper portion of said recycling and work center during a non-portable mode thereof structurally supported by said base;

a can opener;

said can opener attached to said left member;

a paper towel dispenser;

said paper towel dispenser attached to said left member;

a mop;

a first attaching means securing said mop to said left member;

a fire extinguisher;

a second attaching means securing said fire extinguisher to said left member;

a bottle opener;

said bottle opener attached to said left member.

2. The device of claim 1 wherein is provided:

a can crusher;

said can crusher attached to said right member;

a first aid kit;

said first aid kit attached to said right member;

a third attaching means securing said first aid kit to said right member;

a dust pan;

a fourth attaching means securing said dust pan to said right member;

a broom;

a fifth attaching means securing said broom to said right member.

3. The device of claim 1 having a plurality of shelves comprising a a middle shelf, and a bottom shelf, horizontally disposed between said left member and said right member;

means attaching said shelves to said left member and said right member;

said shelves removable from said recycling and work center;

said shelves comprising broadened structures of solid phase and of rigid configuration.

4. The device of claim 1 having a clock attached to a front surface of said rear member and disposed near the top thereof;

said clock removable thereform.

5. The device of claim 3 having provided thereto a pair of wheels with an axle;

said axle and said wheels rotationally attached to said floor;

means providing manned propulsion of said recycling and work center comprising a plurality of handles disposed rearwardly thereof;

said recycling and work center having said middle shelf and said bottom shelf removable therefrom, said recycling and work center thereby operational as a hand truck.

6. The device of claim 3 having a plurality of apertures through said bottom shelf thereof;

said aperatures providing access to a plurality of containers disposed between said bottom shelf and said floor.

7. An energy efficient, modular, ergonomic work center comprising a portable organizing and recycling and work center forming an integrated structure, comprising: a right member comprising a first surface vertically disposed, a rear member comprising a broad rear surface structure vertically disposed, a left member comprising a second broad surface structure vertically disposed, said right and left members being rigidly attached to said rear member in a manner providing cavity means on the forward side of said rear member a floor member comprising a broad lower structure horizontally disposed, said floor member being rigidly attached to said rear member in a manner providing cavity means on the forward side of said rear member, a floor member comprising a broad lower structure horizontally disposed, said floor member being rigidly attached to said left and said rear and said right members, a top member comprising a broad top surface structure horizontally disposed, said top member being rigidly attached to said left and said rear and said right members, said right and left members defining parts of an upper portion of said recycling and work center, a skirt comprising a plurality of a flat elongated members each disposed in a vertical plane and attached to one another at angles of ninety degrees and forming a structure of low height defining a structural base, said structural base being disposed below and attached to said left and right members, said upper portion of said recycling and work center during a non-portable mode thereof being structurally supported by said base, a can opener, said can opener being attached to said left member, a paper towel dispensary, said paper towel dispenser being attached to said left member, a mop, a first attaching means securing said mop to said left member, a fire extinguisher, a second attaching means securing said fire extinguisher to said left member, a bottle opener, said bottle opener being attached to said left member, a can crusher, said can crusher being attached to said right member, a first aid kit, said first aid kit being attached to said right member, a third attaching means securing said first aid kit to said right member, a dust pan, a fourth attaching means securing said dust pan to said right member, a broom, a fifth attaching means securing said broom to said right member.

8. The work center of claim 7 having a plurality of shelves comprising a middle shelf and a bottom shelf both horizontally disposed between said left member and said right member, means attaching said shelves to said left member and said right member, said shelves being removable from said recycling and work center, said bottom shelf having a plurality of apertures therethrough for providing access to a plurality of containers disposed between said bottom shelf and floor.

* * * * *